(12) United States Patent
　Ishikawa et al.

(10) Patent No.: US 12,195,952 B2
(45) Date of Patent: Jan. 14, 2025

(54) SAFETY MONITORING SYSTEM

(71) Applicant: Yanmar Power Technology Co., Ltd., Osaka (JP)

(72) Inventors: Yoshihisa Ishikawa, Fukuoka (JP); Hiroyuki Muraoka, Fukuoka (JP); Hiromu Nagata, Fukuoka (JP); Kotaro Matsuishi, Fukuoka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 17/743,471

(22) Filed: May 13, 2022

(65) Prior Publication Data

US 2022/0364332 A1　Nov. 17, 2022

(30) Foreign Application Priority Data

May 14, 2021　(JP) ................ 2021-082536

(51) Int. Cl.
　*E02F 9/26*　(2006.01)
　*B60R 1/22*　(2022.01)
　*E02F 9/24*　(2006.01)
　*G01S 17/08*　(2006.01)
　*G06T 7/521*　(2017.01)
　*G06V 10/44*　(2022.01)
　*G06V 20/56*　(2022.01)
　*G08B 21/02*　(2006.01)
　　　(Continued)

(52) U.S. Cl.
　CPC ............... *E02F 9/261* (2013.01); *B60R 1/22* (2022.01); *E02F 9/24* (2013.01); *G01S 17/08* (2013.01); *G06T 7/521* (2017.01); *G06V 10/44* (2022.01); *G06V 20/56* (2022.01); *G08B 21/02* (2013.01); *H04N 5/33* (2013.01); *H04N 7/183* (2013.01); *G06T 2207/10048* (2013.01); *G06T 2207/30196* (2013.01); *G06T 2207/30261* (2013.01)

(58) Field of Classification Search
　CPC .... E02F 9/261; E02F 9/24; B60R 1/22; G06T 2207/10048; G06T 2207/30196; G06T 2207/30261; H04N 5/33; H04N 7/183
　See application file for complete search history.

(56) References Cited

U.S. PATENT DOCUMENTS

2015/0325120 A1* 11/2015 Cho .................. G08G 1/166
　　　　　　　　　　　　　　　　　　　348/149
2016/0176338 A1　6/2016 Husted et al.
2016/0332569 A1* 11/2016 Ishida ................ B60W 50/16
　　　　　　　(Continued)

FOREIGN PATENT DOCUMENTS

EP　　2617903 A1　7/2013
GB　　2443987 A　　5/2008

*Primary Examiner* — Kathleen V Nguyen
(74) *Attorney, Agent, or Firm* — Chris Mizumoto

(57) ABSTRACT

To make it easier for an operator to notice an object in the surroundings of a construction machine. A safety monitoring system includes a detection device, a display unit, and a control unit. The detection device detects an object in the surroundings of the work vehicle. The display unit displays a captured image of the surroundings of the work vehicle. The control unit controls the detection device and the display unit. If the detection device detects an object, the control unit controls the display unit to display an image with a defined edge obtained by applying an edge-defining process to the image of the surroundings.

8 Claims, 11 Drawing Sheets

(51) Int. Cl.
*H04N 5/33* (2023.01)
*H04N 7/18* (2006.01)

(56) References Cited

U.S. PATENT DOCUMENTS

| | | |
|---|---|---|
| 2017/0018070 A1 | 1/2017 | Onuma et al. |
| 2018/0370435 A1* | 12/2018 | Konno ................. B60W 50/14 |
| 2022/0042286 A1* | 2/2022 | Tsuji ....................... G06F 3/147 |

* cited by examiner

SAFETY MONITORING SYSTEM

CROSS-REFERENCE

This application claims foreign priority of JP2021-082536 filed May 14, 2021, the disclosure of which is hereby incorporated by reference in its entirety.

TECHNICAL FIELD

The present invention relates to a safety monitoring system.

BACKGROUND ART

In a work machine, a construction machine, and the like used at a construction site, for example, a camera captures an image of an obstacle and the like in the surroundings and the captured image is displayed on a display device, so that an operator confirms the safety.

The work machine of Patent Document 1 detects, in addition to the captured image, obstacles or people in the surroundings by using a distance sensor. If the distance sensor detects an obstacle, a display device displays information indicating that an obstacle other than a person is present in the surroundings. If the distance sensor detects a person, the display device displays information indicating that a person is present in the surroundings.

PRIOR ART DOCUMENT

Patent Document

Patent Document 1: Japanese Unexamined Patent Application Publication No. 2020-51156

SUMMARY OF INVENTION

Technical Problem

For example, an operator may not steadily look at the display device while operating the construction machine and may not notice the presence of an obstacle or a person.

The present invention has been contrived in view of the problems described above, and an object thereof is to provide a safety monitoring system in which an operator can more easily notice an object in the surroundings of a construction machine.

Solution to Problem

A safety monitoring system according to the present invention includes a detection device, a display device, and a control device. The detection device detects an object in the surroundings of a construction machine. The display device displays a captured image of the surroundings of the construction machine. The control device controls the detection device and the display device. If the detection device detects the object, the control device controls the display device to display an image with a defined edge obtained by applying an edge-defining process to the image of the surroundings.

Advantageous Effects of Invention

According to the present invention, an operator can more easily notice an object in the surroundings of a construction machine.

DESCRIPTION OF EMBODIMENTS

Figure 1:
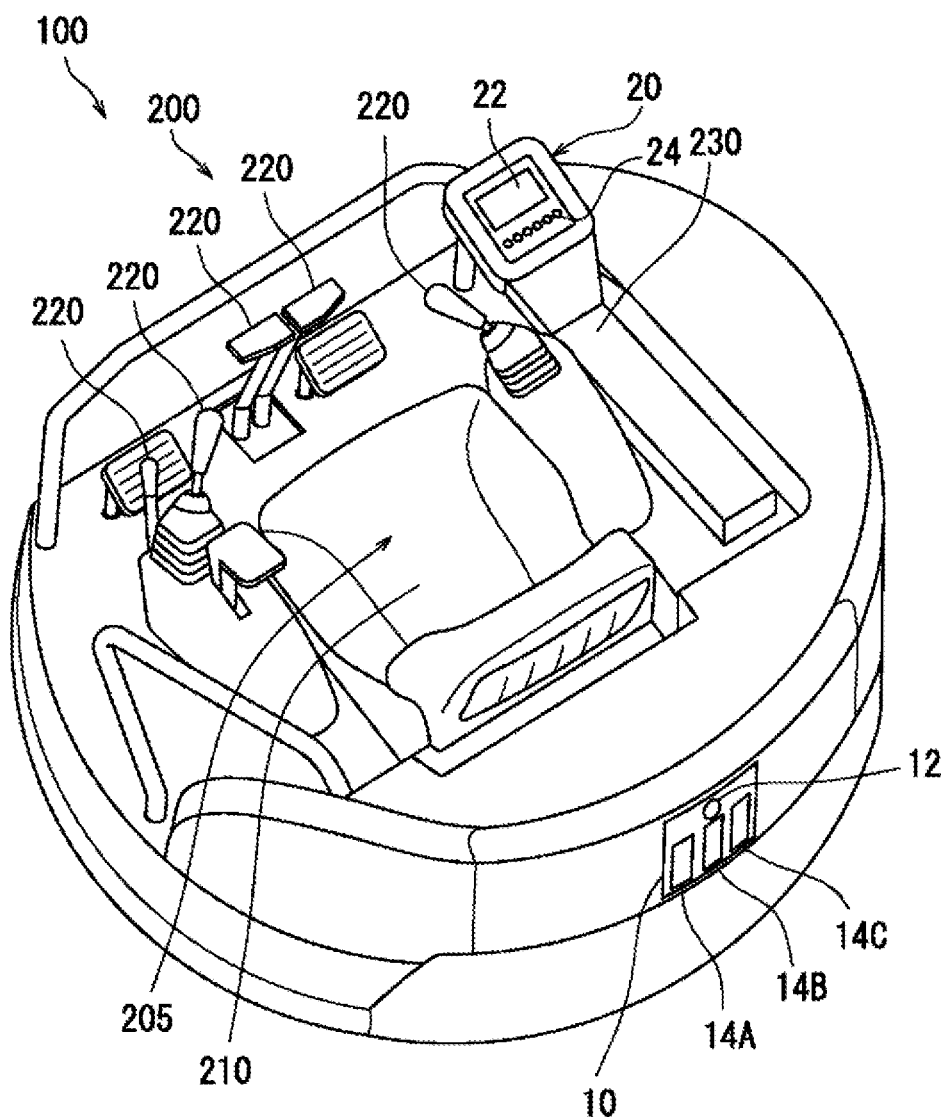
FIG. 1 is a perspective view illustrating an upper turning body of a work vehicle.

Embodiments of the present invention will be described below with reference to the drawings. It is noted that, in the drawings, like reference numerals will be used for identical or corresponding parts to omit duplicate descriptions.

Figure 2:
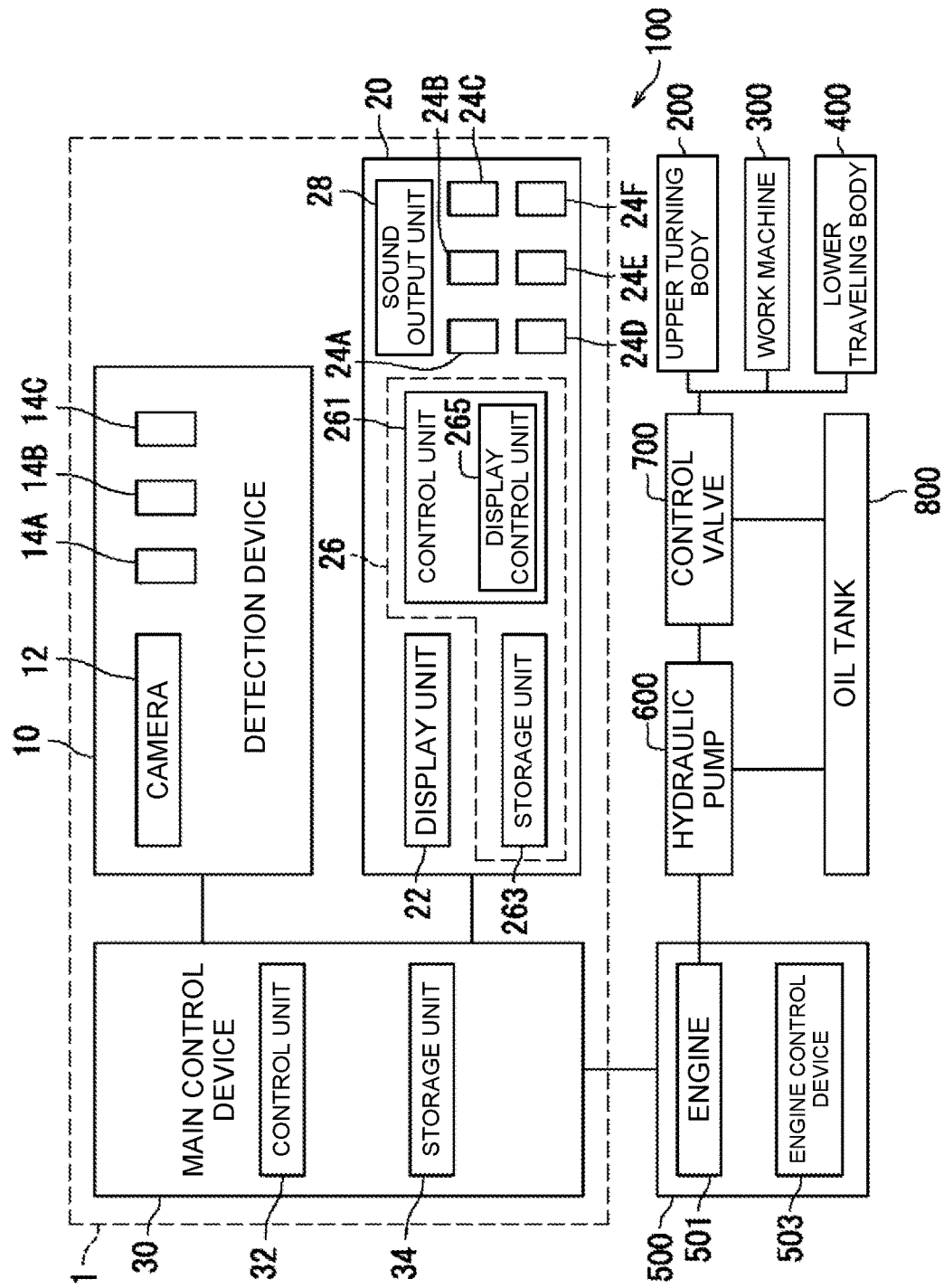
FIG. 2 is a block diagram illustrating a work vehicle equipped with a safety monitoring system.

Firstly, a work vehicle 100 equipped with a safety monitoring system 1 according to an embodiment of the present invention will be described with reference to FIGS. 1 and 2. FIG. 1 is a perspective view illustrating an upper turning body 200 of the work vehicle 100. In FIG. 1, a roof of the upper turning body 200 is omitted to facilitate understanding of the drawing. FIG. 2 is a block diagram illustrating the work vehicle 100 equipped with the safety monitoring system 1. The present embodiment will be described below using an example where the work vehicle 100 is a hydraulic excavator. The hydraulic excavator is an example of a construction machine. The safety monitoring system 1 includes a detection device, a control device, and a display device.

As illustrated in FIG. 1, the work vehicle 100 includes the upper turning body 200. The upper turning body 200 turns with respect to a lower traveling body 400 (FIG. 2 described later). The upper turning body 200 is driven by a hydraulic pump 600 (FIG. 2 described later) and a hydraulic motor (not illustrated) to turn. A work machine 300 (FIG. 2 described later) is attached to the upper turning body 200.

Specifically, the upper turning body 200 includes a steering room 205, a seat 210, a plurality of operation levers 220, and an arrangement member 230.

An operation device 20, a detection device 10, the seat 210, the plurality of operation levers 220, and the arrangement member 230 are arranged in the steering room 205. An operator is seated in the seat 210. The operator is a person who steers the work vehicle 100. Each of the plurality of operation levers 220 receives an operation from the operator. The operation levers 220 are operation members for operating the work vehicle 100.

When receiving an operation from the operator, the operation device 20 operates the work vehicle 100, receives various types of information to the work vehicle 100, and displays various types of information about the work vehicle 100.

The detection device 10 detects a state of the surroundings of the work vehicle 100. For example, the detection device 10 includes a camera 12 that captures an image of the surroundings of the work vehicle 100, and infrared sensors 14A, 14B, and 14C. The detection device 10 is provided behind the seat 210 in the upper turning body 200, for example.

In the detection device 10 provided behind the seat 210, the camera 12 captures, for example, an image of a situation behind the work vehicle 100, to generate a camera picture.

The infrared sensors 14A, 14B, and 14C are time of flight (TOF) sensors, for example. Specifically, the infrared sensors 14A, 14B, and 14C emit infrared light. If there is an object in a movement direction, the infrared light emitted from the infrared sensors 14A, 14B, and 14C is reflected by the object. The reflected infrared light reflected by the object travels toward the infrared sensors 14A, 14B, and 14C. The infrared sensors 14A, 14B, and 14C receive the reflected infrared light. The infrared sensors 14A, 14B, and 14C measure the time from the emission of the infrared light to the reception of the reflected infrared light, and measure a distance to the object, based on the measured time.

The operation device 20 displays various types of information and receives a pressing operation from the operator.

The operation device 20 displays an image of the surroundings of the construction machine. The operation device 20 includes a display unit 22 and a plurality of push buttons 24. The display unit 22 displays, for example, various types of information about the work vehicle 100 such as a state of the work vehicle 100 and a graphical user interface (GUI). The display unit 22 further displays a camera picture captured by the camera 12. The camera picture is an example of an image of the surroundings of the construction machine.

The display unit 22 is an example of the display device, and includes a liquid crystal display or an organic electroluminescence display, for example. The display unit 22 may include a touch panel. In this case, each of the push buttons 24 may be displayed on the display unit 22 as a GUI widget.

As illustrated in FIG. 2, in addition to the operation device 20 and the upper turning body 200, the work vehicle 100 further includes the work machine 300, the lower traveling body 400, a blade (not illustrated), an engine unit 500, the hydraulic pump 600, a control valve 700, and an oil tank 800. The operation device 20 further includes a main control device 30. The main control device 30 is arranged, for example, inside the upper turning body 200 at a position different from that of the operation device 20. The main control device 30 is an example of a control device.

The work machine 300 executes a work. Specifically, the work machine 300 includes a bucket (not illustrated), an arm (not illustrated), a boom (not illustrated), and a plurality of hydraulic cylinders (not illustrated).

The upper turning body 200 is arranged above the lower traveling body 400 via a swivel joint (not illustrated). The lower traveling body 400 travels. Specifically, the lower traveling body 400 includes a pair of crawlers (not illustrated) and a pair of hydraulic motors (not illustrated).

The engine unit 500 includes an engine 501 and an engine control device 503. The engine control device 503 controls the engine 501. The engine control device 503 is an electronic control unit (ECU), for example. The engine 501 is supplied with fuel from a fuel tank (not illustrated).

The engine 501 drives the hydraulic pump 600. As a result, the hydraulic pump 600 supplies pressurized oil to the control valve 700. The pressurized oil refers to oil under pressure. The control valve 700 controls the flow of the pressurized oil, according to an operation of each operation lever 220. The control valve 700 supplies pressurized oil to the hydraulic motor of the upper turning body 200, each of the hydraulic cylinders of the work machine 300, each of the hydraulic motors of the lower traveling body 400, and a hydraulic cylinder (not illustrated) that drives the blade.

The operation device 20 further includes a display control device 26 and a sound output unit 28. The display control device 26 controls the display unit 22. The display control device 26 is an ECU, for example. The sound output unit 28 outputs a sound. The sound output unit 28 is an example of an audio output device, and includes, for example, a speaker or a buzzer.

Specifically, the display control device 26 includes a control unit 261 and a storage unit 263. The control unit 261 includes a processor such as a central processing unit (CPU). The storage unit 263 includes a storage device and stores data and a computer program. Specifically, the storage unit 263 includes a main storage device such as a semiconductor memory and an auxiliary storage device such as a semiconductor memory, a solid state drive, and/or a hard disk drive. The storage unit 263 may include removable media. The storage unit 263 corresponds to an example of a non-transitory computer-readable storage medium.

The control unit 261 outputs, to the main control device 30, various types of information input or set according to an operation on the screen displayed on the display unit 22.

The control unit 261 includes a display control unit 265. Specifically, a processor of the control unit 261 executes the computer program stored in the storage device of the storage unit 263 to function as the display control unit 265. The display control unit 265 controls the display unit 22. For example, the display control unit 265 controls the screen displayed on the display unit 22, according to operation information (ON information or OFF information) indicating whether the push buttons 24A to 24F are pressed. The display control unit 265 will be described in detail later.

The main control device 30 controls the detection device 10, the operation device 20, and the engine unit 500. The main control device 30 is an ECU, for example.

Specifically, the main control device 30 includes a control unit 32 and a storage unit 34. The control unit 32 includes a processor such as a CPU. The storage unit 34 includes a storage device and stores data and a computer program. A hardware configuration of the storage unit 34 is similar to a hardware configuration of the storage unit 263, for example.

The control unit 32 acquires, from the control unit 261 of the display control device 26, various types of information input or set according to the operation on the screen displayed on the display unit 22.

The operator can grasp a situation behind the work vehicle 100 by looking at a camera picture displayed on the display unit 22. However, the operator may not steadily look at the display unit 22 while operating the work vehicle 100, and may not notice an object included in the camera picture displayed on the display unit 22.

On the other hand, in the present embodiment, even if the operator cannot steadily look at the display unit 22, the operator can easily notice the object in the surroundings of the work vehicle 100.

[Detection of Object]

Specifically, if the detection device 10 detects an object, the main control device 30 controls the display unit 22 to display an image with a defined edge obtained by applying an edge-defining process to the camera picture.

Figure 3:
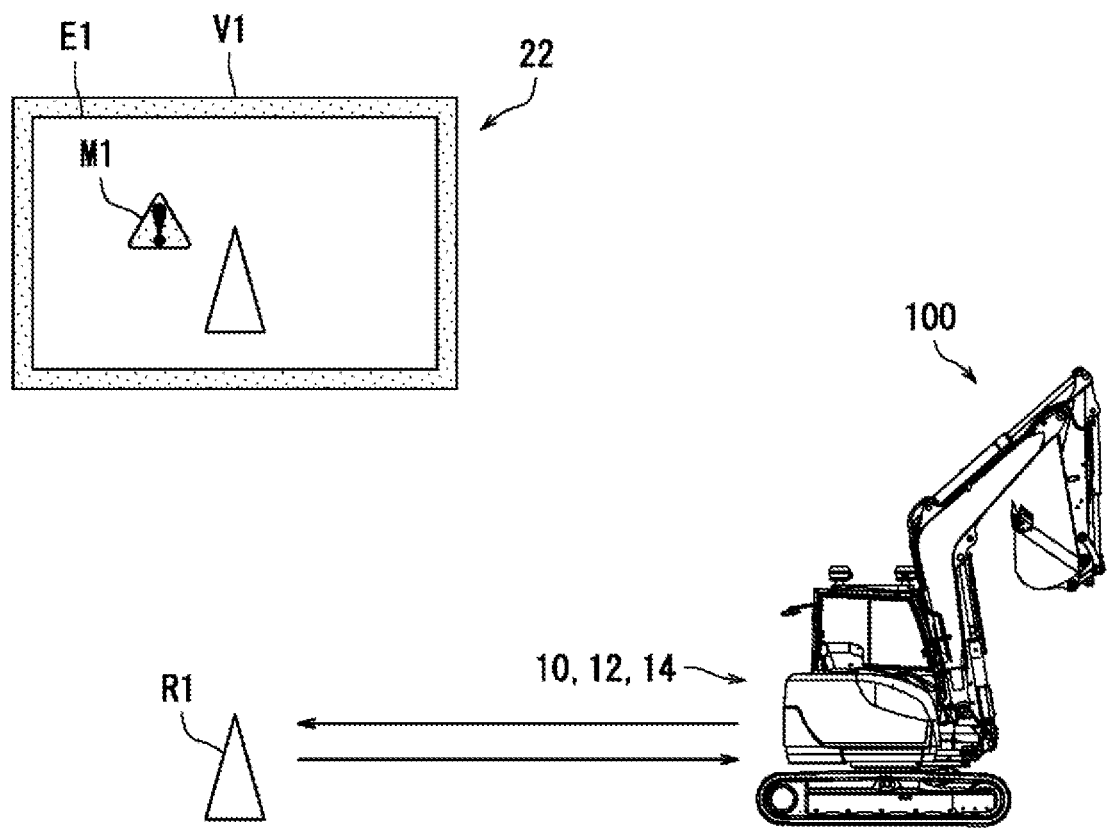
FIG. 3 is a diagram illustrating the detection of an object by a detection device and an image with a defined edge.

Next, the detection of an object by the detection device 10 and the image with a defined edge will be described with reference to FIG. 3. FIG. 3 is a diagram illustrating the detection of the object by the detection device 10 and an image with a defined edge.

FIG. 3 schematically illustrates the detection of a triangular cone R1, as an example of the object, by an infrared sensor 14, to illustrate a state where the triangular cone R1 is comprehensively detected by the infrared sensors 14A, 14B, and 14C. The detection by each of the infrared sensors 14A, 14B, and 14C will be described in detail later.

The display unit 22 displays, under the control of the main control device 30, a camera picture captured by the camera 12. The camera picture is an image illustrating a situation behind the work vehicle 100. The camera picture includes an object corresponding to the triangular cone R1 located behind the work vehicle 100.

The infrared sensor 14 emits infrared light. The infrared light emitted from the infrared sensor 14 reaches the triangular cone R1 and is reflected by the triangular cone R1. The reflected infrared light reflected by the triangular cone R1 travels toward the infrared sensor 14. The infrared sensor 14 receives the reflected infrared light.

When receiving the reflected infrared light, the infrared sensor 14 determines that an object exists in an emission direction of the infrared light. On the other hand, when the infrared sensor 14 fails to receive the reflected infrared light, the infrared sensor 14 determines that no object exists in the emission direction of the infrared light.

The main control device 30 acquires a determination result of the infrared sensor 14 and controls the display unit 22 to display an image with a defined edge V1 obtained by applying an edge-defining process E1 to the camera picture, according to the determination result. In other words, when the infrared sensor 14 determines that an object exists in the emission direction of the infrared light, the display unit 22 displays the image with a defined edge V1 in which the edge-defining process E1 is applied to the camera picture.

As described above, if an object exists in the surroundings (behind) of the work vehicle 100, the display of the entire screen of the display unit 22 changes, so that the operator can easily notice the object.

For example, when the infrared sensor 14 determines that an object exists in the emission direction of the infrared light, the main control device 30 controls the display unit 22 to add a warning indication M1 to the camera picture, in addition to applying the edge-defining process E1.

In the present embodiment, a color used in the edge-defining process and a color of the warning indication may be changed, according to the distance to the object.

Figure 4:
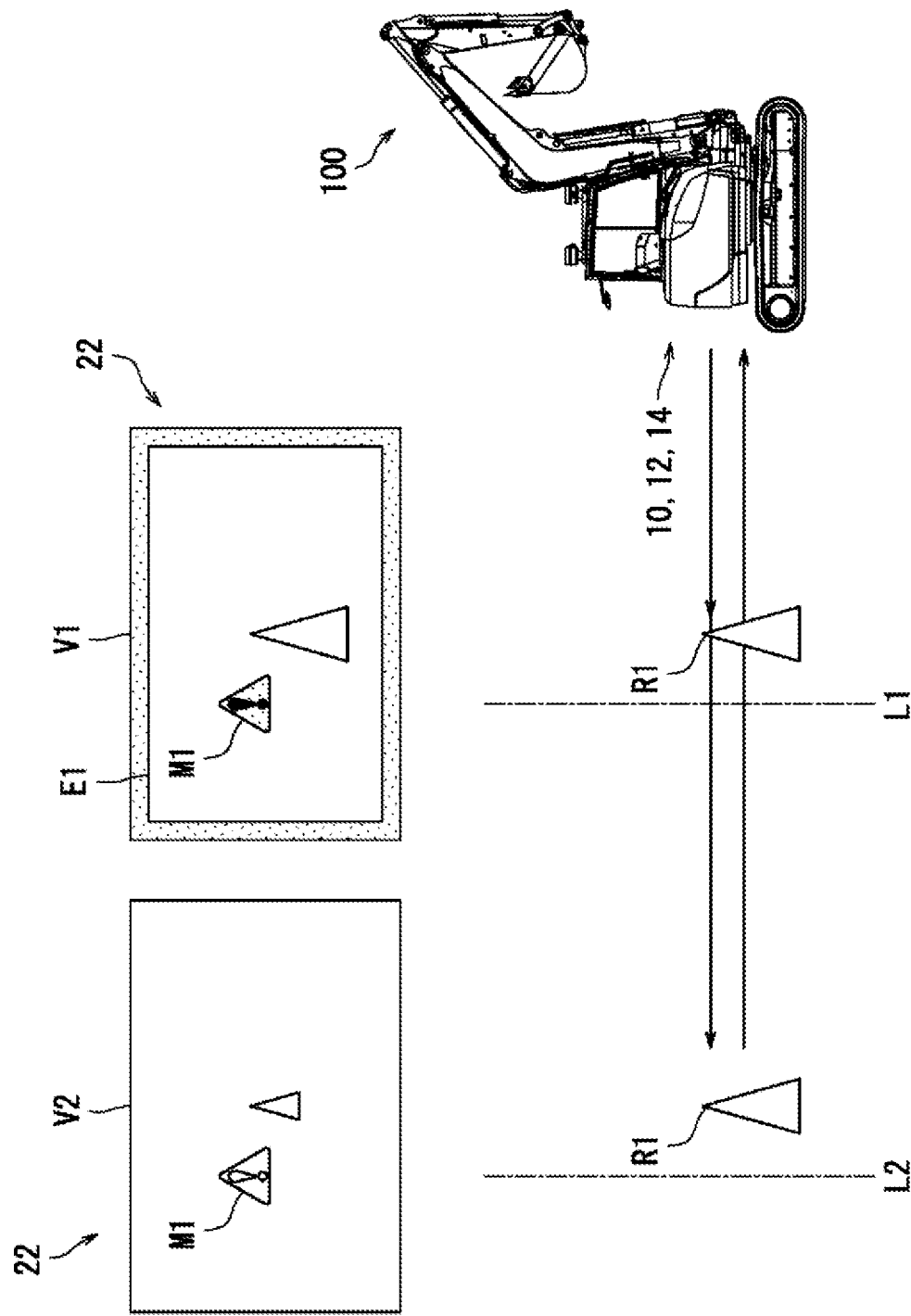
FIG. 4 is a diagram illustrating the detection of a distance to an object by the detection device and a screen displayed on a display unit, according to the distance.

Next, the detection of the distance to the object by the detection device 10 will be described with reference to FIG. 4. FIG. 4 is a diagram illustrating the detection of the distance to an object by the detection device 10 and a screen displayed on the display unit 22, according to the distance.

The detection device 10 measures the distance to the object. Specifically, as illustrated in FIG. 4, the infrared sensor 14 measures a time from emitting the infrared light to receiving the reflected infrared light reflected by the triangular cone R1, and calculates the distance to the triangular cone R1, based on the measured time.

The main control device 30 acquires the distance to the triangular cone R1 measured by the infrared sensor 14, and determines the color used in the edge-defining process E1 and the color of the warning indication M1, according to the acquired distance.

For example, if the triangular cone R1 is installed closer than a distance L2 from the work vehicle 100, the main control device 30 controls the display unit 22 to add, for example, the warning indication M1 in "yellow" to the camera picture. The display unit 22 displays, under the control of the main control device 30, a camera picture V2 added with the warning indication M1 in "yellow". In FIG. 4, "yellow" is illustrated without hatching.

On the other hand, for example, if the triangular cone R1 is installed closer to the work vehicle 100 than a distance L1 shorter than the distance L2, the main control device 30 controls the display unit 22 to display, for example, the image with a defined edge V1 obtained by applying, to the camera picture, the edge-defining process E1 using "red" and further, adding the warning indication M1 in "red".

In FIG. 4, if the triangular cone R1 is installed closer than the distance L2 from the work vehicle 100, the camera picture V2 is not subjected to the edge-defining process, but the camera picture V2 may be subjected to an edge-defining process using "yellow", for example.

Thus, the screen displayed on the display unit 22 changes according to the distance to the object, so that the operator is likely to pay attention to a closer object.

[Detection of Person]

Figure 5:
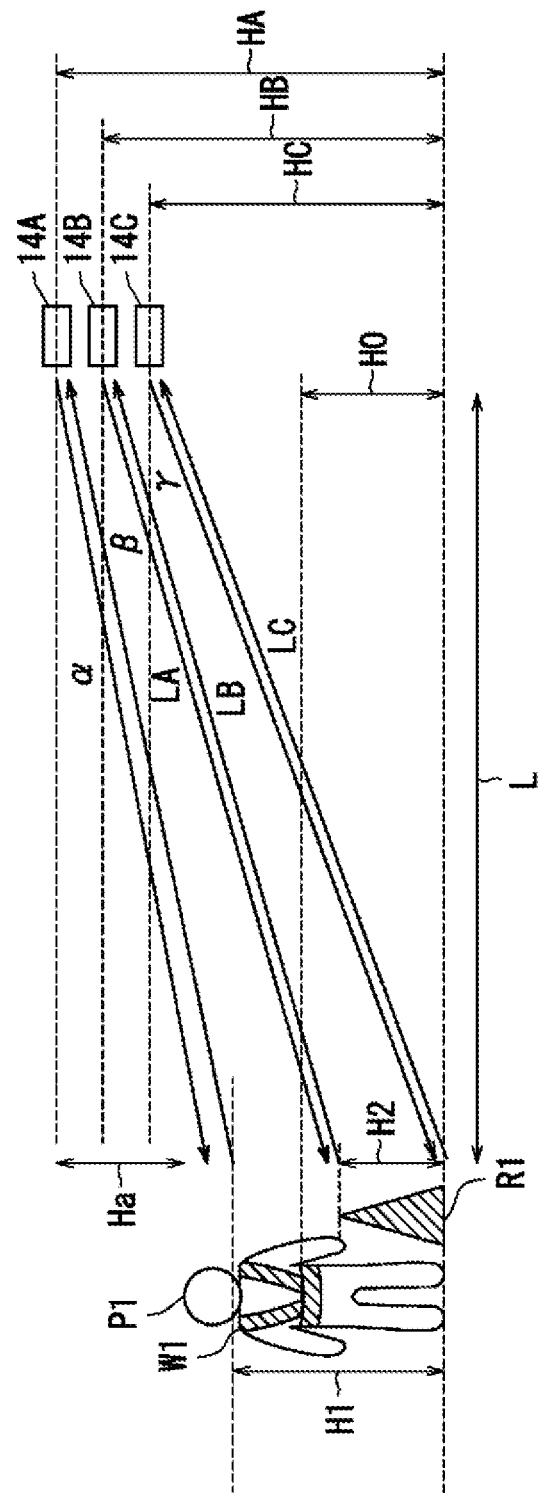
FIG. 5 is a diagram illustrating the detection of a person or an object item by the detection device.

Next, the detection of a person by the detection device 10 will be described with reference to FIG. 5. FIG. 5 is a diagram illustrating the detection of a person or an object item by the detection device 10. FIG. 5 describes in detail the detection of a person or an object item by the infrared sensors 14A, 14B, and 14C.

The infrared sensors 14A, 14B, and 14C each emit infrared light at different angles in the same direction. For example, the infrared sensor 14A emits infrared light at an elevation angle (depression angle) $\alpha$, the infrared sensor 14B emits infrared light at an elevation angle (depression angle) $\beta$, and the infrared sensor 14C emits infrared light at an elevation angle (depression angle) $\gamma$. The following relationship is assumed: elevation angle (depression angle) $\alpha$<elevation angle (depression angle) $\beta$<elevation angle (depression angle) $\gamma$.

The infrared light emitted from the infrared sensor 14A at the elevation angle (depression angle) $\alpha$ reaches the triangular cone R1, a person P1, or the ground and is reflected. The reflected infrared light reflected by any one of the triangular cone R1, the person P1, or the ground is received by the infrared sensor 14A.

The infrared sensor 14A calculates a distance LA to a reflection point of the infrared light, based on a time when the reflected infrared light obtained from the reflection of the emitted infrared light is received. The infrared sensor 14A further calculates a distance L between the infrared sensor 14A and the reflection point, based on the calculated distance LA and the elevation angle (depression angle) $\alpha$.

The infrared sensor 14A calculates a height from the ground at the reflection point of the infrared light, based on the calculated distance LA and the elevation angle (depression angle) $\alpha$. Specifically, the infrared sensor 14A calculates a distance Ha by which the emitted infrared light descends from the infrared sensor 14A, based on the calculated distance LA and the elevation angle (depression angle) α. The infrared sensor 14A calculates the height from the ground at the reflection point of the infrared light by subtracting the calculated distance Ha from a height HA set to the infrared sensor 14A.

Similarly to the infrared sensor 14A, the infrared sensors 14B and 14C calculate distances LB and LC between the infrared sensors 14B and 14C and the reflection points, respectively. The infrared sensor 14B calculates the distance L and the height from the ground at the reflection point, based on the distance LB and the elevation angle (depression angle) β. The infrared sensor 14C calculates the distance L and the height from the ground at the reflection point, based on the distance LC and the elevation angle (depression angle) γ.

For example, if the calculated height from the ground at the reflection point is larger than zero, the infrared sensors 14A, 14B, and 14C detect the existence of an object at a position separated from the infrared sensors 14A, 14B, and 14C by the distance L.

In the present embodiment, the infrared sensors 14A, 14B, and 14C determine whether the object is a person, based on an intensity of the reflected infrared light. For example, at a construction site where the work vehicle 100 is used, the person P1 wears a reflection vest W1 having a high reflectance of infrared light. Therefore, the intensity of reflected infrared light reflected by the person P1 (the reflection vest W1) increases. On the other hand, the intensity of reflected infrared light reflected by an object item (such as a triangular cone) is weaker than that of the reflected infrared light reflected by the person P1 (the reflection vest W1).

The infrared sensors 14A, 14B, and 14C measure the intensity of the received reflected infrared light, and if the intensity of the reflected infrared light is stronger than a predetermined intensity, the infrared sensors 14A, 14B, and 14C determine that the object reflecting the infrared light is a person. On the other hand, if the intensity of the reflected infrared light is weaker than the predetermined intensity, the infrared sensors 14A, 14B, and 14C determine that the object reflecting the infrared light is an object item.

Here, the infrared sensors 14A, 14B, and 14C intermittently repeat emission of infrared light and reception of reflected infrared light, to measure the intensity of the reflected infrared light each time the reflected infrared light is received. For example, the infrared sensors 14A, 14B, and 14C calculate an average of the intensities (an average intensity) of a plurality of reflected infrared light beams, and if the average intensity is stronger than a predetermined intensity, the infrared sensors 14A, 14B, and 14C determine that the object reflecting the infrared light is a person.

For example, if the triangular cone R1 has the same reflectance as the reflection vest W1, the infrared sensors 14A, 14B, and 14C erroneously determine that the triangular cone R1 reflecting the infrared light is a person.

To prevent such an erroneous determination, the infrared sensors 14A, 14B, and 14C determine, even when the intensity of the reflected infrared light is stronger than the predetermined intensity, that the object reflecting the infrared light is an object item, if the height from the ground at the reflection point of the reflected infrared light is lower than a predetermined height.

For example, a case where the infrared sensors 14A, 14B, and 14C detect the person P1 and a case where the infrared sensors 14A, 14B, and 14C detect the triangular cone R1 having the same reflectance as the reflection vest W1 will be comparatively described. In FIG. 5, it is assumed that the person P1 and the triangular cone R1 are located at the same position separated from the infrared sensors 14A, 14B, and 14C by the distance L.

If the infrared sensor 14A detects the person P1, the infrared sensor 14A calculates, as described above, the distance L to the reflection point and a height H1 from the ground at the reflection point.

The infrared sensor 14A determines that the intensity of the reflected infrared light is stronger than the predetermined intensity. The intensity of the reflected infrared light is stronger than the predetermined intensity, and the height H1 from the ground at the reflection point is higher than a predetermined height H0, and thus, the infrared sensor 14A determines that the object reflecting the infrared light is a person.

On the other hand, if the infrared sensor 14B detects the triangular cone R1, the infrared sensor 14B calculates, similarly to the infrared sensor 14A described above, the distance L to the reflection point and a height H2 from the ground at the reflection point. The infrared sensor 14B determines that the intensity of the reflected infrared light is stronger than the predetermined intensity. The intensity of the reflected infrared light is stronger than the predetermined intensity, and the height H2 from the ground at the reflection point is lower than the predetermined height H0, and thus, the infrared sensor 14B determines that the object reflecting the infrared light is an object item.

Thus, by determining whether an object reflecting the infrared light is a person or an object item, based on the intensity of the reflected infrared light and the height of the object reflecting the infrared light, the possibility of an erroneous determination of a person and an object item is reduced.

In the present embodiment, an intensity (a threshold value) of the reflected infrared light at which the infrared sensor 14 determines that the object is a person may be different before and after the detection of the person P1.

For example, after the person P1 is detected, the intensity of the reflected infrared light may decrease depending on the position, the angle, and the like of the person P1, and the person P1 may be erroneously determined as an object item. To prevent such an erroneous determination, if the infrared sensor 14 detects the person P1, the infrared sensor 14 lowers the threshold value of the reflected infrared light.

Thus, after the person P1 is detected, the infrared sensor 14 continues to determine the person P1 as a person until the intensity of the reflected infrared light is lower than a lowered threshold value. Therefore, after the person P1 is detected, the possibility that the person P1 is erroneously determined as an object item is reduced.

[Warning Sound]

In the present embodiment, if the detection device 10 detects a person, the sound output unit 28 may emit a warning sound.

Figure 6:
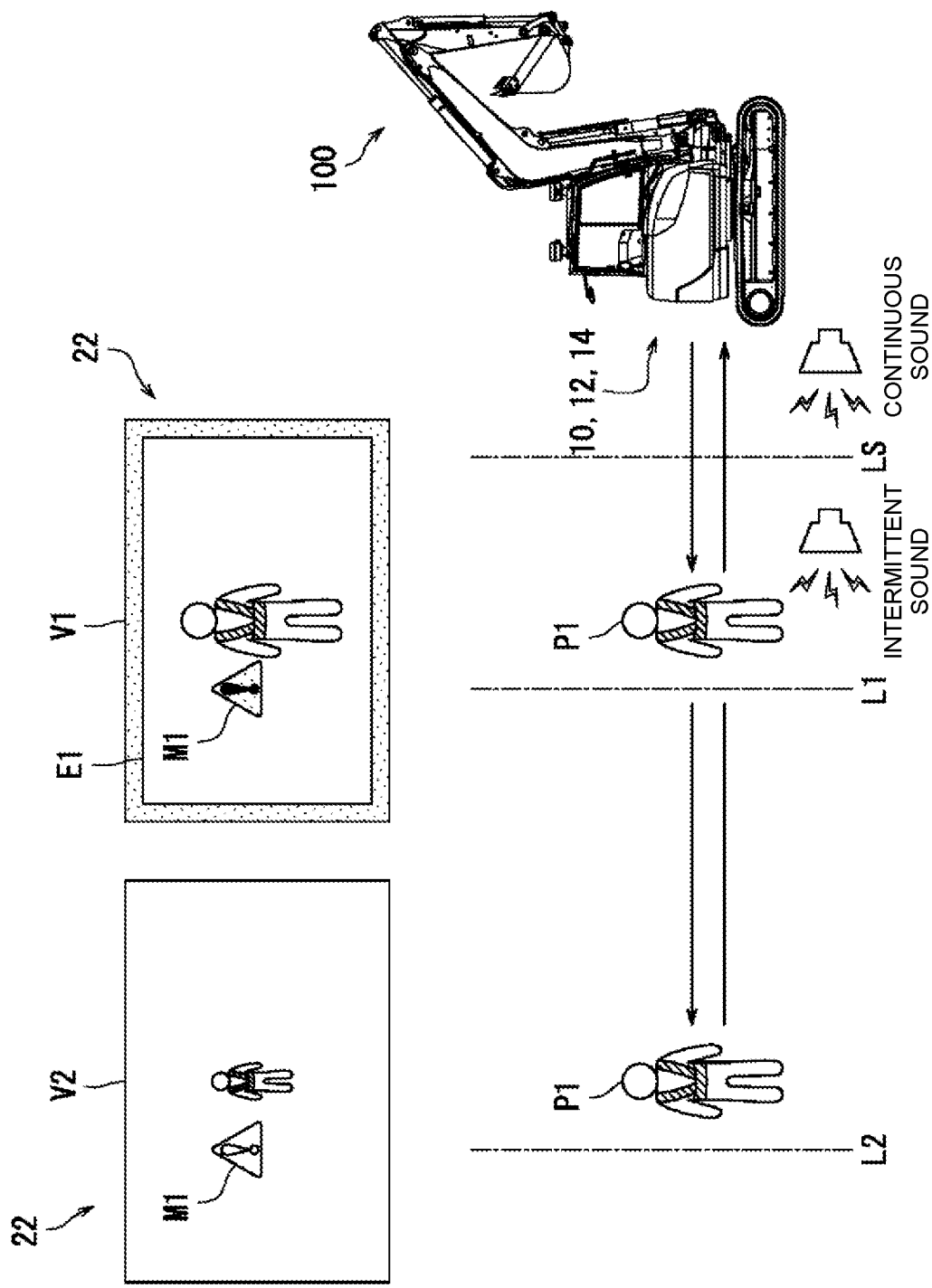
FIG. 6 is a diagram illustrating the detection of a person by the detection device, a screen displayed on the display unit according to the distance to the person, and a warning sound output from a sound output unit.

Next, the warning sound output in the safety monitoring system according to the present embodiment will be described with reference to FIG. 6. FIG. 6 is a diagram illustrating the detection of the person P1 by the detection device 10, a screen displayed on the display unit 22 according to the distance to the person P1, and a warning sound output from the sound output unit 28.

Similar to the detection of the triangular cone R1 by the detection device 10 illustrated in FIG. 4, if the detection device 10 detects the person P1, the main control device 30 acquires the distance to the person P1 measured by the infrared sensor 14, and determines the color used in the edge-defining process E1 and in the warning indication M1, according to the acquired distance.

For example, if the person P1 is farther than the distance L1 and closer than the distance L2 from the work vehicle 100, the main control device 30 controls the display unit 22 to add the warning indication M1 in "yellow" to the camera picture, for example. The display unit 22 displays, under the control of the main control device 30, the camera picture V2 added with the warning indication M1 in "yellow". In FIG. 6, "yellow" is illustrated without hatching.

On the other hand, for example, if the person P1 is closer to the work vehicle 100 than the distance L1, the main control device 30 controls the display unit 22 to display, for example, the image with a defined edge V1 obtained by applying, to the camera picture, the edge-defining process E1 using "red" and further, adding the warning indication M1 in "red".

The main control device 30 controls the sound output unit 28 to output a warning sound if the person P1 is closer than the distance L1.

The main control device 30 controls the sound output unit 28 to change the warning sound, according to the distance to the person P1 detected by the detection device 10. For example, as illustrated in FIG. 6, if the distance to the person P1 measured by the detection device 10 is shorter than the distance L1 and farther than a distance LS, the main control device 30 controls the sound output unit 28 to output an intermittent warning sound. On the other hand, the main control device 30 controls the sound output unit 28 to output a continuous warning sound if the distance to the person P1 is shorter than the distance LS.

In the present embodiment, the distances L1, L2, and LS are provided with a hysteresis depending on whether the person P1 approaches the work vehicle 100 or moves away from the work vehicle 100. In other words, for example, a distance by which a first state where the warning indication M1 is not added to the camera picture V2 changes to a second state where the warning indication M1 is added to the camera picture V2 is different from a distance by which the second state changes to the first state. Specifically, the distance by which the second state changes to the first state is longer than the distance by which the first state changes to the second state.

Specifically, it is assumed that the distance L2 is 10 m, the distance L1 is 5 m, and the distance LS is 3 m, for example. If the infrared sensor 14 determines that the distance from the work vehicle 100 to the person P1 exceeds 10 m, the warning indication M1 is not added to the camera picture displayed on the display unit 22.

In this state, if the person P1 approaches the work vehicle 100 and the infrared sensor 14 determines that the distance from the work vehicle 100 to the person P1 is 10 m, the camera picture V2 (added with the warning indication M1) is displayed on the display unit 22.

Assuming a case where no hysteresis is provided, if the person P1 moves away from the work vehicle 100 even a little from the above state, the infrared sensor 14 determines that the distance from the work vehicle 100 to the person P1 exceeds 10 m, and a camera picture not added with the warning indication M1 is displayed on the display unit 22. If the person P1 further approaches the work vehicle 100 even a little, the camera picture V2 (added with the warning indication M1) is displayed on the display unit 22.

As described above, in a case where the hysteresis is not provided, if the person P1 is at a position slightly closer or farther than the distance L2, the camera picture of the display unit 22 may change rapidly, and the operator may not be able to accurately grasp a state of the surroundings of the work vehicle 100.

Therefore, if the person P1 within 10 m of the work vehicle 100 moves away from the work vehicle 100 by more than 10 m, the main control device 30 sets the distance L2 to 11 m. The same applies to the distances L1 and LS.

Figure 7:
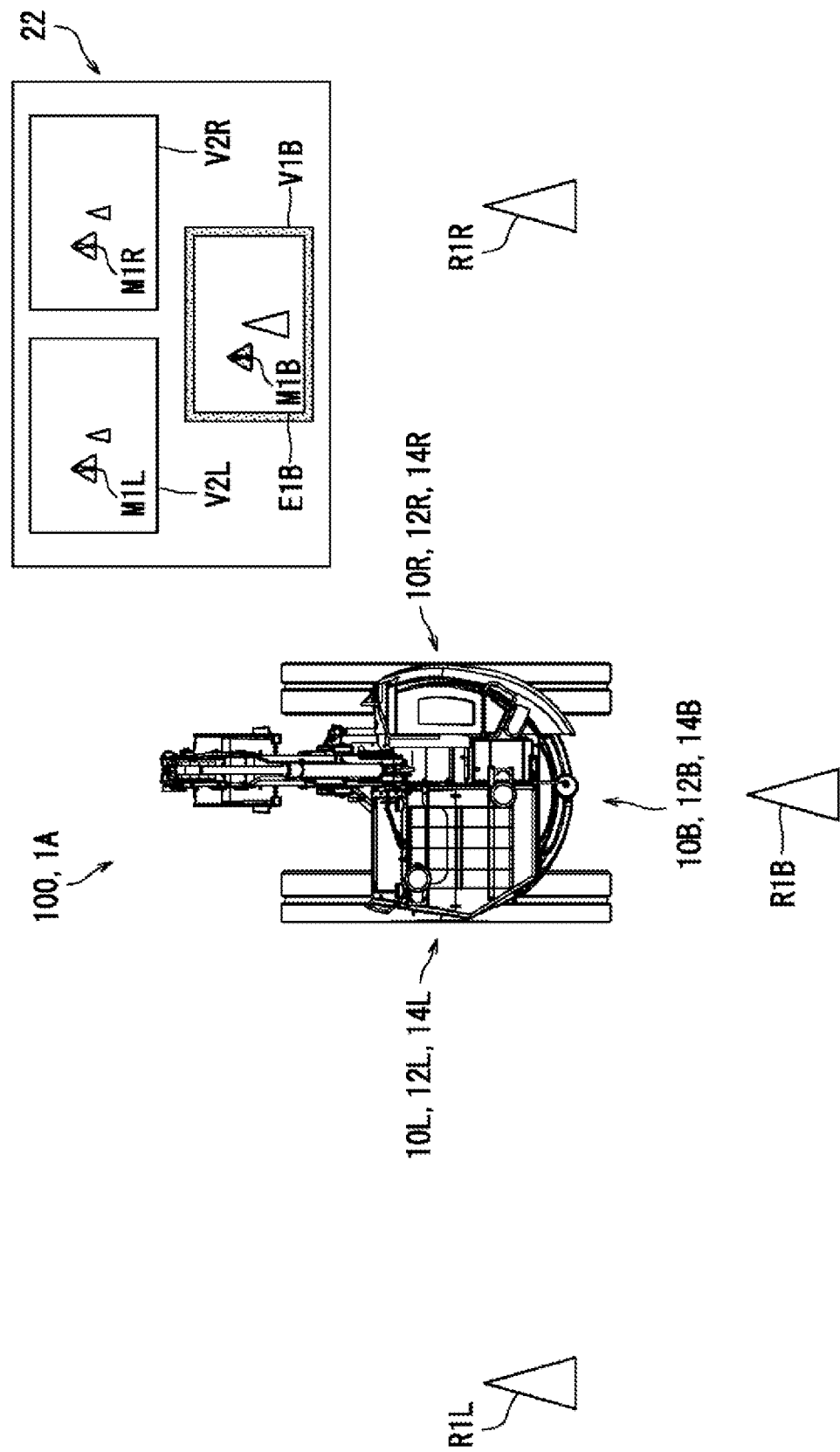
FIG. 7 is a view of the work vehicle equipped with the safety monitoring system, viewed from above.

Next, a safety monitoring system 1A according to an embodiment of the present invention will be described with reference to FIG. 7. FIG. 7 is a view of the work vehicle 100 equipped with the safety monitoring system 1A, viewed from above.

The safety monitoring system 1A includes detection devices 10L, 10B, and 10R, a control device (the main control device 30), and a display device (the display unit 22). The detection devices 10L, 10B, and 10R each detect an object in a corresponding direction. Specifically, the detection device 10L is provided, for example, on the left of the seat 210 in the upper turning body 200 and detects a state on the left side of the work vehicle 100. The detection device 10L includes a camera 12L that captures an image on the left side of the work vehicle 100 and an infrared sensor 14L. The plurality of infrared sensors 14 included in the detection device 10 are collectively referred to as the infrared sensor 14L. The camera 12L captures an image on the left side of the work vehicle 100 to generate a camera picture. The infrared sensor 14L detects a triangular cone R1L located on the left side of the work vehicle 100 and calculates a distance to the triangular cone R1L.

The detection device 10B is provided, for example, behind the seat 210 in the upper turning body 200, and detects a state behind the work vehicle 100. The detection device 10B includes a camera 12B that captures an image of the state behind the work vehicle 100, and the infrared sensor 14B. The plurality of infrared sensors 14 included in the detection device 10 are collectively referred to as the infrared sensor 14B. The camera 12B captures an image of the state behind the work vehicle 100 to generate a camera picture. The infrared sensor 14B detects a triangular cone R1B located behind the work vehicle 100 and calculates a distance to the triangular cone R1B.

The detection device 10R is provided, for example, on the right of the seat 210 in the upper turning body 200 and detects a state on the right side of the work vehicle 100. The detection device 10R includes a camera 12R that captures an image on the right side of the work vehicle 100 and an infrared sensor 14R. The plurality of infrared sensors 14 included in the detection device 10 are collectively referred to as the infrared sensor 14R. The camera 12R captures an image on the right side of the work vehicle 100 to generate a camera picture. The infrared sensor 14R detects a triangular cone R1R located on the right side of the work vehicle 100 and calculates a distance to the triangular cone R1R.

An operation of each of the detection devices 10L, 10B, and 10R is the same as the operation of the detection device 10 in the safety monitoring system 1.

The display unit 22 displays, under the control of the main control device 30, camera pictures in each direction captured by the cameras 12L, 12B, and 12R on one screen.

Specifically, the main control device 30 acquires the camera pictures captured by each of the cameras 12L, 12B, and 12R, and controls the display unit 22 so that the acquired camera pictures are displayed side by side on one screen. For example, the camera picture captured by the camera 12L is displayed on the upper left of the display unit 22, the camera picture captured by the camera 12B is displayed in the lower center of the display unit 22, and the camera picture captured by the camera 12R is displayed on the upper right of the display unit 22.

If the detection devices 10L, 10B, and 10R detect the triangular cones R1L, R1B, and R1R, respectively, the main control device 30 applies an edge-defining process to the corresponding camera pictures, in accordance with the distance to the triangular cones R1L, R1B, and R1R, to add a warning indication to the camera pictures.

Specifically, for example, if the detection device 10L detects the triangular cone R1L and the distance to the triangular cone R1L is equal to or greater than the distance L1 and less than the distance L2 (FIG. 4), the main control device 30 controls the display unit 22 to display, on the upper left of the display unit 22, a camera picture V2L obtained by adding a warning indication M1L in "yellow" to the camera picture captured by the camera 12L.

For example, if the detection device 10B detects the triangular cone R1B and the distance to the triangular cone R1B is less than the distance L1 (FIG. 4), the main control device 30 controls the display unit 22 to display, in the lower center of the display unit 22, an image with a defined edge V1B obtained by applying an edge-defining process E1B using "red" and further adding a warning indication M1B in "red" to the camera picture captured by the camera 12B.

For example, if the detection device 10R detects the triangular cone R1R and the distance to the triangular cone R1R is equal to or greater than the distance L1 and less than the distance L2 (FIG. 4), the main control device 30 controls the display unit 22 to display, on the upper right of the display unit 22, a camera picture V2R obtained by adding a warning indication M1R in "yellow" to the camera picture captured by the camera 12R.

Thus, an object in a plurality of directions is detected, it is possible to confirm the object in the plurality of directions on one screen, and thus, it is easier for the operator to confirm the surroundings.

Figure 8:
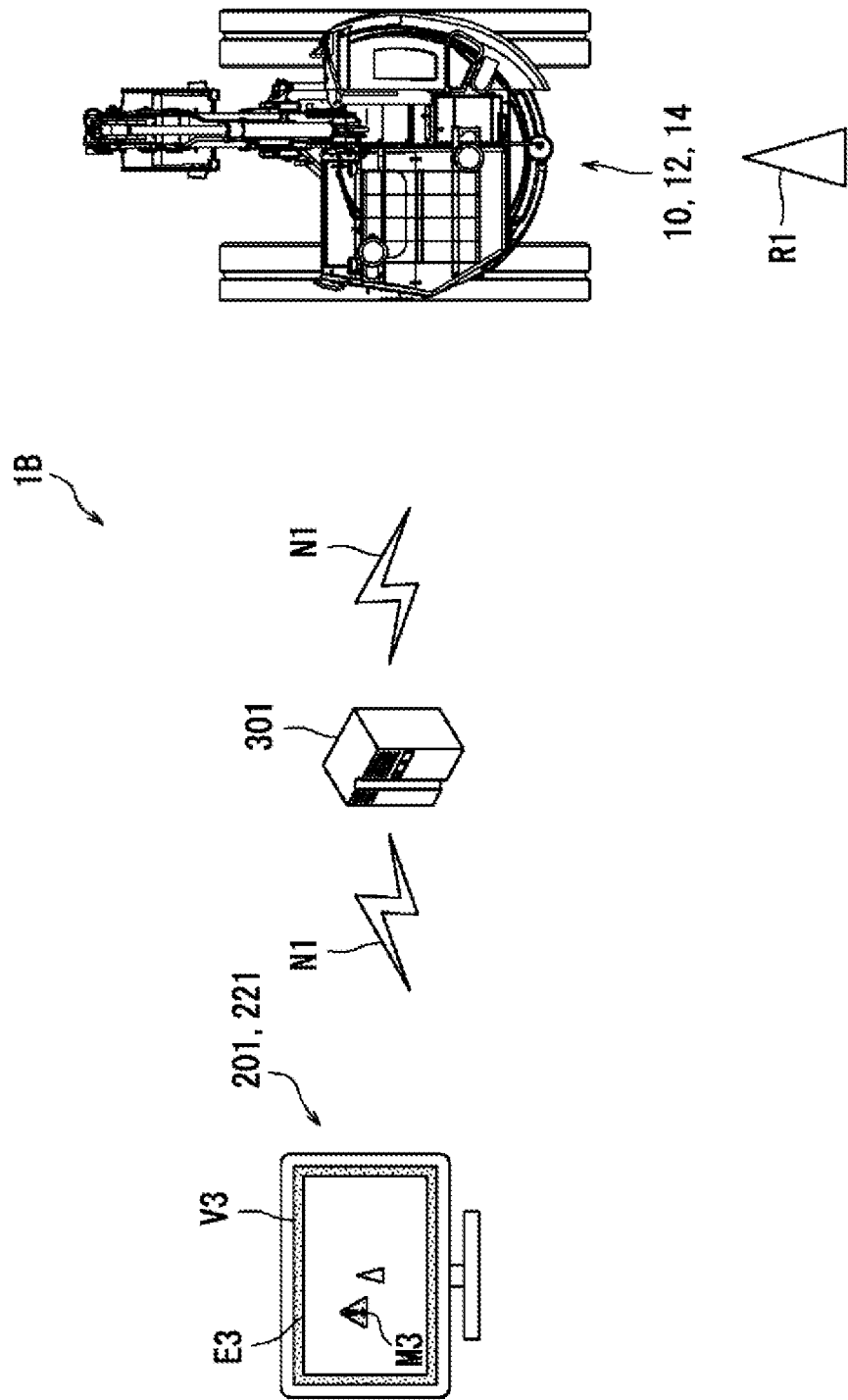
FIG. 8 is a diagram illustrating the safety monitoring system.
Figure 9:
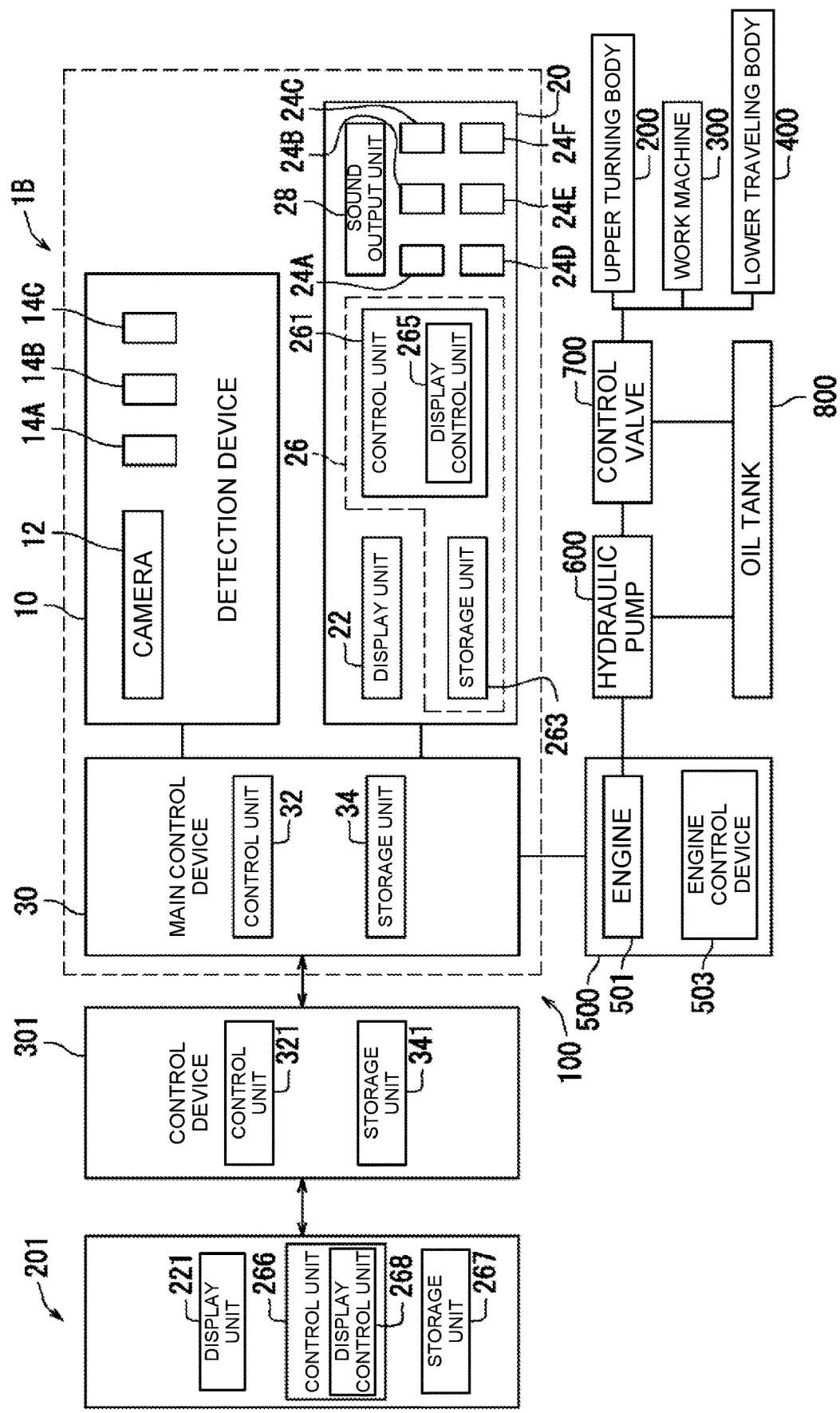
FIG. 9 is a block diagram illustrating the safety monitoring system.

Next, a safety monitoring system 1B according to an embodiment of the present invention will be described with reference to FIGS. 8 and 9. FIG. 8 is a diagram illustrating the safety monitoring system 1B. FIG. 9 is a block diagram illustrating the safety monitoring system 1B. The safety monitoring system 1B includes the detection device 10, a control device 301, and a display device 201.

The detection device 10 is mounted in the work vehicle 100, for example. The work vehicle 100 and the detection device 10 are the same as the work vehicle 100 mounted with the safety monitoring system 1, and the detection device 10.

The control device 301 is, for example, a server or a desktop-type personal computer installed at a place away from a construction site where the work vehicle 100 is used, or a notebook-type personal computer. The control device 301 includes a control unit 321 and a storage unit 341.

The control unit 321 includes a processor such as a CPU. The storage unit 341 includes a storage device and stores data and a computer program. A hardware configuration of the storage unit 341 includes a main storage device such as a semiconductor memory and an auxiliary storage device such as a semiconductor memory, a solid state drive, and/or a hard disk drive. The storage unit 341 may include removable media.

The display device 201 is, for example, a liquid crystal display or an organic electroluminescence display installed in the same place as the control device 301 or a place different from the control device 301. The display device 201 includes a display unit 221, a control unit 266, and a storage unit 267.

The display unit 221 displays various types of information about the work vehicle 100 including, for example, a camera picture captured by the camera 12 provided in the work vehicle 100.

The storage unit 267 includes a storage device and stores data and a computer program.

Specifically, the storage unit 263 includes a main storage device such as a semiconductor memory and an auxiliary storage device such as a semiconductor memory, a solid state drive, and/or a hard disk drive. The storage unit 267 may include removable media.

The control unit 266 includes a processor such as a central processing unit (CPU). The control unit 266 includes a display control unit 268. Specifically, a processor of the control unit 266 executes the computer program stored in the storage device of the storage unit 267 to function as the display control unit 268. The display control unit 268 controls the display unit 221.

The work vehicle 100, the control device 301, and the display device 201 transmit and receive information to and from each other via a network N1 such as a wired local area network (LAN) and a wireless LAN, for example.

For example, the main control device 30 of the work vehicle 100 transmits, to the control device 301, camera picture data indicating a camera picture captured by the detection device 10 (the camera 12), a detection result of the detection device 10 (the infrared sensor 14), and the distance to the object measured by the detection device 10 (the infrared sensor 14). In the example illustrated in FIG. 8, it is assumed that the detection device 10 detects the triangular cone R1 and the distance to the triangular cone R1 is less than the distance L1 (FIG. 4).

The control unit 321 of the control device 301 receives the camera picture data transmitted from the main control device 30, the detection result of the detection device 10 (the infrared sensor 14), and the distance to the object measured by the detection device 10 (the infrared sensor 14).

Based on the received camera picture data, the detection result of the detection device 10 (the infrared sensor 14), and the distance to the object measured by the detection device 10 (the infrared sensor 14), the control unit 321 applies an edge-defining process to the camera picture indicated by the camera picture data or generates processed camera picture data added with a warning indication. In the example illustrated in FIG. 8, for example, the control unit 321 applies an edge-defining process E3 using "red" to the received camera picture, to generate processed camera picture data VD including an image with a defined edge V3 further added with a warning indication M3 in "red".

The control unit 321 transmits the generated processed camera picture data VD to the display device 201.

The display control unit 268 of the display device 201 receives the processed camera picture data VD transmitted from the control device 301. The display control unit 268 controls the display unit 221 to display a camera picture indicated by the received processed camera picture data VD. In the example illustrated in FIG. 8, the display control unit 268 controls the display unit 221 to display the image with a defined edge V3.

Thus, it is easier to notice a change in the state of the surroundings of the work vehicle 100 at a place away from the construction site where the work vehicle 100 is used, so that more reliable safety monitoring is possible at the construction site.

The work vehicle 100 in the safety monitoring system 1B may be the work vehicle 100 equipped with the safety monitoring system 1A illustrated in FIG. 7, for example. In this case, the display device 201 displays the same screen as the screen displayed on the display unit 22 illustrated in FIG. 7.

Figure 10:
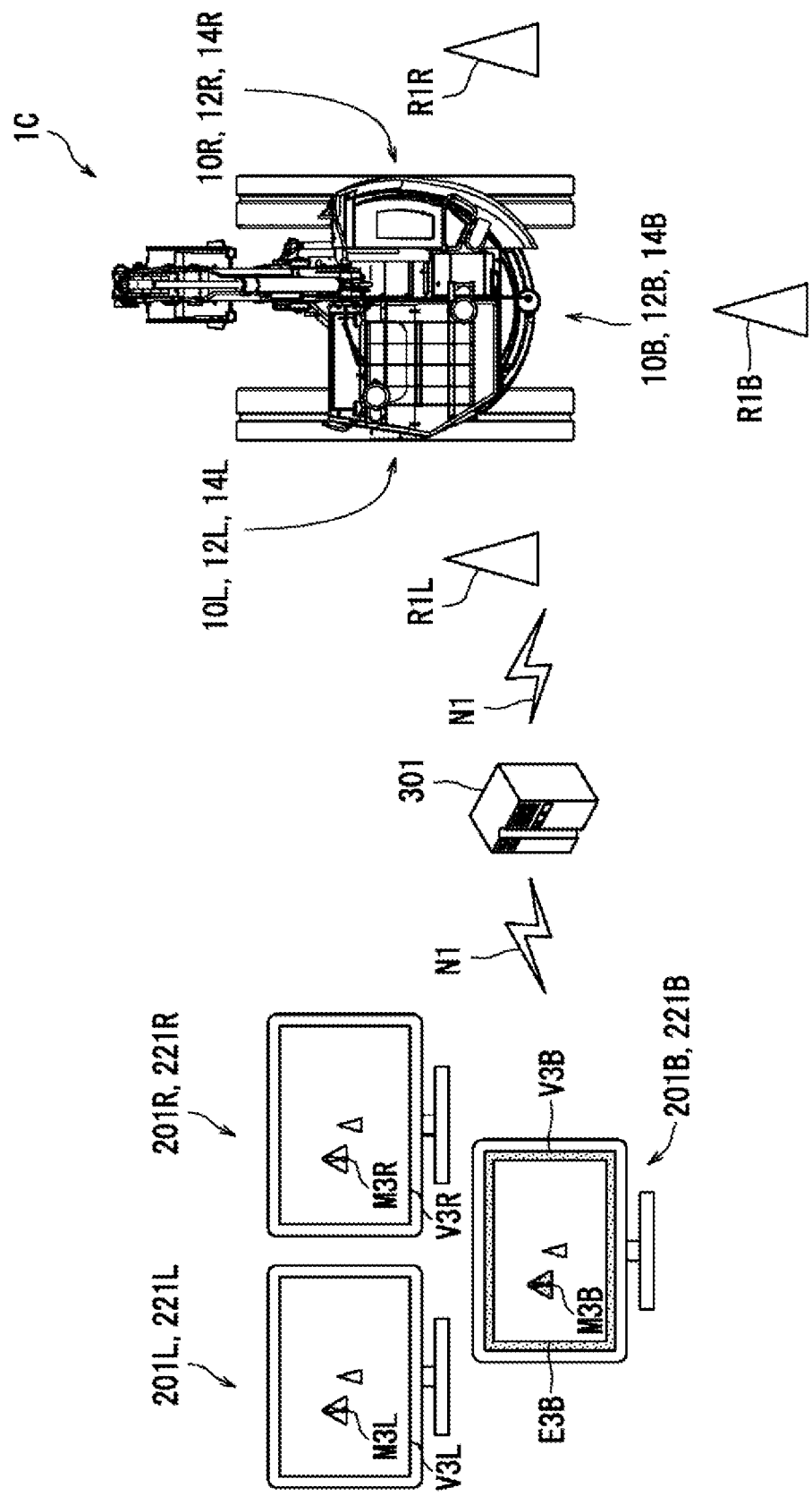
FIG. 10 is a diagram illustrating the safety monitoring system.

Next, a safety monitoring system 1C according to an embodiment of the present invention will be described with reference to FIG. 10. FIG. 10 is a diagram illustrating the safety monitoring system 1C. The safety monitoring system 1C includes the plurality of detection devices 10L, 10B, and 10R, the control device 301, and a plurality of display devices 201L, 201B, and 201R. The detection devices 10L, 10B, and 10R are the same as the detection devices 10L, 10B, and 10R in the work vehicle 100 equipped with the safety monitoring system 1A illustrated in FIG. 7. The control device 301 is the same as the control device 301 illustrated in FIGS. 8 and 9. Each of the display devices 201L, 201B, and 201R is the same as the display device 201 illustrated in FIGS. 8 and 9.

The display devices 201L, 201B, and 201R display various types of information about the work vehicle 100 including camera pictures captured by each of the corresponding cameras 12 provided in the work vehicle 100. Specifically, the display device 201L displays various types of information about the work vehicle 100 including a camera picture captured by the camera 12L. The display device 201B displays various types of information about the work vehicle 100 including a camera picture captured by the camera 12B.

The display device 201R displays various types of information about the work vehicle 100 including a camera picture captured by the camera 12R.

For example, the main control device 30 of the work vehicle 100 transmits, to the control device 301, pieces of camera picture data indicating camera pictures captured by each of the detection devices 10 (the cameras 12L, 12B, and 12R), detection results of each of the detection devices 10 (the infrared sensors 14L, 14B, and 14R), and the distance to the object measured by each of the detection devices 10 (the infrared sensors 14L, 14B, and 14R). In the example illustrated in FIG. 10, it is assumed that the detection device 10L detects the triangular cone R1L and the distance to the triangular cone R1L is equal to or greater than the distance L1 and less than the distance L2 (FIG. 4), the detection device 10B detects the triangular cone R1B and the distance to the triangular cone R1B is less than the distance L1 (FIG. 4), and the detection device 10R detects the triangular cone R1R and the distance to the triangular cone R1R is less than the distance L1 (FIG. 4).

The control unit 321 of the control device 301 receives each piece of camera picture data transmitted from the main control device 30, the detection results of each of the detection devices 10 (the infrared sensors 14L, 14B, and 14R), and the distance to the object measured by each of the detection devices 10 (the infrared sensors 14L, 14B, and 14R).

Based on the received pieces of camera picture data, the detection results of the corresponding detection devices 10 (the infrared sensors 14), and the distance to the object measured by the detection devices 10 (the infrared sensors 14), the control unit 321 applies an edge-defining process to the camera pictures indicated by the corresponding pieces of camera picture data or generates processed camera picture data added with a warning indication.

In the example illustrated in FIG. 10, for example, the control unit 321 generates processed camera picture data VDL including a camera picture V3L obtained by adding a warning indication M3L in "yellow" to the camera picture captured by the camera 12L, among the received pieces of camera picture data.

For example, the control unit 321 applies an edge-defining process E3B using "red" to the camera picture captured by the camera 12B, among the received pieces of camera picture data, to generate processed camera picture data VDB including an image with a defined edge V3B further added with a warning indication M3B in "red".

The control unit 321 generates processed camera picture data VDR including a camera picture V3R obtained by adding a warning indication M3R in "yellow" to the camera picture captured by the camera 12R, among the received pieces of camera picture data.

The control unit 321 transmits each piece of generated processed camera picture data to each of the corresponding display devices 201L, 201B, and 201R.

The display control unit 268 of the display device 201L receives the processed camera picture data VDL transmitted from the control device 301. The display control unit 268 controls the display unit 221 to display a camera picture indicated by the received processed camera picture data VDL. In the example illustrated in FIG. 10, the display control unit 268 controls the display unit 221 to display the camera picture V3L.

The display control unit 268 of the display device 201B receives the processed camera picture data VDB transmitted from the control device 301. The display control unit 268 controls the display unit 221 to display a camera picture indicated by the received processed camera picture data VDB. In the example illustrated in FIG. 10, the display control unit 268 controls the display unit 221 to display the image with a defined edge V3B.

The display control unit 268 of the display device 201R receives the processed camera picture data VDR transmitted from the control device 301. The display control unit 268 controls the display unit 221 to display a camera picture indicated by the received processed camera picture data VDR. In the example illustrated in FIG. 10, the display control unit 268 controls the display unit 221 to display the camera picture V3R.

Thus, it is possible to use a plurality of display devices to confirm the surroundings of the work vehicle 100 at a place away from a construction site where the work vehicle 100 is used, so that more reliable safety monitoring is possible when the work vehicle 100 is remotely operated, for example.

Figure 11:
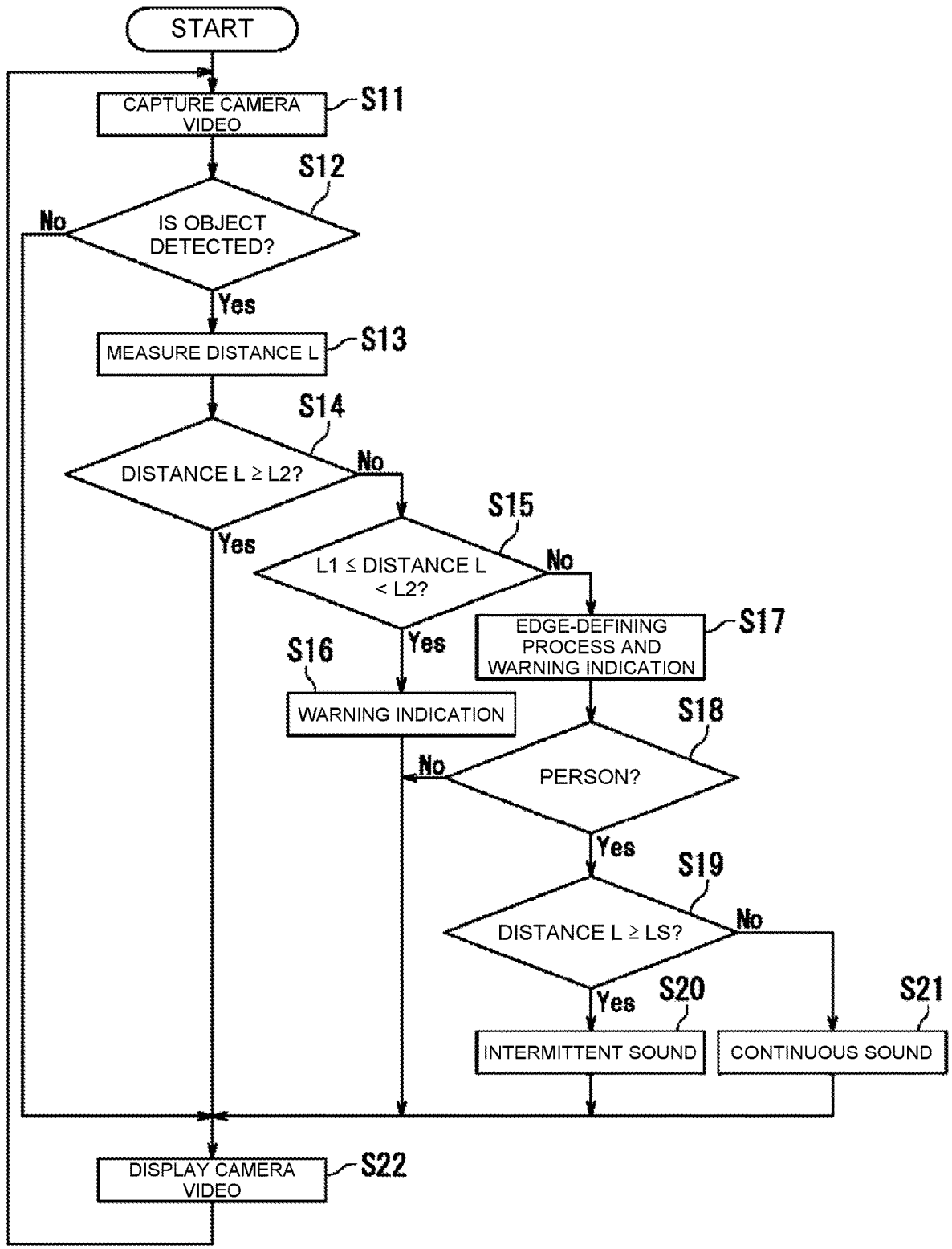
FIG. 11 is a flowchart illustrating a safety monitoring method according to an embodiment of the present invention.

Next, a safety monitoring method according to an embodiment of the present invention will be described with reference to FIG. 11. FIG. 11 is a flowchart illustrating the safety monitoring method according to the embodiment of the present invention.

The detection device 10 (the camera 12) captures a camera picture of the surroundings (step S11).

The detection device 10 (the infrared sensor 14) detects an object in the surroundings (step S12).

If the detection device 10 does not detect an object in the surroundings (No in step S12), the display unit 22 displays a camera picture captured by the camera 12 (step S22).

If the detection device 10 detects an object in the surroundings (Yes in step S12), the infrared sensor 14 measures the distance L to the detected object (step S13).

The main control device 30 applies an edge-defining process or adds a warning indication to the camera picture, according to the distance L measured by the infrared sensor 14. The main control device 30 determines whether the distance L is equal to or greater than the distance L2 (FIG. 4) (step S14).

If the distance L is equal to or greater than the distance L2 (Yes in step S14), the display unit 22 displays a camera picture captured by the camera 12 (step S22).

On the other hand, if the distance L is less than the distance L2 (No in step S14), the main control device 30 determines whether the distance L is equal to or greater than the distance L1 (FIG. 4) (and less than the distance L2) (step S15). If the distance L is equal to or greater than the distance L1 (FIG. 4) (and less than the distance L2) (Yes in step S15), the main control device 30 adds, for example, a warning indication M1 in "yellow" to the camera picture (step S16). The display unit 22 displays the camera picture added with the warning indication M1 in "yellow" (step S22).

If the distance L is less than the distance L1 (No in step S15), the main control device 30 applies the edge-defining process E1 using "red" to the camera picture captured by the camera 12, to generate the image with a defined edge V1 further added with the warning indication M1 in "red" (step S17).

The infrared sensor 14 determines whether the detected object is a person, based on the intensity of the reflected infrared light from the detected object (step S18). If the object detected by the infrared sensor 14 is not a person but an object item (No in step S18), the display unit 22 displays a camera picture including the image with a defined edge V1 (step S22).

On the other hand, if the object detected by the infrared sensor 14 is a person (Yes in step S18), the main control device 30 determines whether the distance L is equal to or greater than the distance LS (FIG. 6) (and less than the distance L1) (step S19).

If the distance L is equal to or greater than the distance LS (Yes in step S19), the sound output unit 28 outputs an intermittent warning sound (step S20). The display unit 22 displays the camera picture including the image with a defined edge V1 (step S22).

On the other hand, if the distance L is less than the distance LS (No in step S19), the sound output unit 28 outputs a continuous warning sound (step S21). The display unit 22 displays the camera picture including the image with a defined edge V1 (step S22).

In the present embodiment, a configuration in which the object is detected by the infrared sensor 14 using infrared light is employed, but the embodiment is not limited thereto, and a configuration in which an object is detected by applying an image process to the camera picture may also be employed.

The embodiment of the present invention is described above with reference to the drawings (FIGS. 1 to 11). However, the present invention is not limited to the embodiment described above, and may be implemented in various modes without departing from the spirit of the present invention. The drawings schematically illustrate the constituent elements mainly for the sake of easy understanding, and the thickness, length, number, and the like of each of the constituent elements illustrated are different from the actual dimensions on account of preparation of the drawings. Further, the materials, shapes, dimensions, and the like of the constituent elements illustrated in the above-described embodiment are merely examples, and are not particularly limited, and various modifications can be made without substantially departing from the effects of the present invention.

INDUSTRIAL APPLICABILITY

The present invention can be utilized in fields including construction machines, work vehicles, and the like at construction sites.

REFERENCE SIGNS LIST 1, 1A, 1B, 1C . . . Safety monitoring system
10, 10B, 10L, 10R . . . Detection device
12, 12B, 12L, 12R . . . Camera
14, 14A, 14B, 14C, 14L, 14R . . . Infrared sensor
20 . . . Operation device
22, 221, 221B, 221L, 221R . . . Display unit
26, 261 . . . Display control device
28 . . . Sound output unit
30 . . . Main control device
32, 266, 321 . . . Control unit
100 . . . Work vehicle
201, 201B, 201L, 201R . . . Display device
265, 268 . . . Display control unit
301 . . . Control device
E1, E1B, E3, E3B . . . Edge-defining process
L, L1, L2, LA, LB, LC, LS . . . Distance
M1, M1B, M1L, M1R, M3, M3B, M3L, M3R . . . Warning indication
P1 . . . Person
R1, R1B, R1L, R1R . . . Triangular cone
V1, V1B, V3, V3B . . . Image with defined edge
V2, V2L, V2R, V3L, V3R . . . Camera picture

The invention claimed is:

1. A safety monitoring system, comprising:
a detection device that detects an object in surroundings of a construction machine;
a display device that displays a captured image of the surroundings of the construction machine on a display unit of the display device; and
a control device that controls the detection device and the display device,
wherein if the detection device detects the object, the control device controls the display device to display an image with a defined edge obtained by applying an edge-defining process to the image of the surroundings, the defined edge is displayed along the edge of the display unit, and the image of the surroundings the object which is displayed by being surrounded by the defined edge, and
wherein, if the detection device detects the object, the control device controls the display device to add a warning sign to the image of the surroundings, and
wherein the detection device measures a distance to the object, and the control device displays the warning sign without displaying the defined edge when the distance is a first distance, displays the warning sign with the defined edge when the distance is a second distance that is closer than the first distance.

2. The safety monitoring system according to claim 1, wherein
the detection device measures a distance to the object, and
the control device changes a color used in the edge-defining process and a color of the warning sign, in accordance with the distance measured by the detection device.

3. The safety monitoring system according to claim 2, wherein the detection device emits infrared light, receives reflected infrared light obtained when the infrared light is reflected by the object, and measures the distance to the object, based on a time from emission of the infrared light to reception of the reflected infrared light.

4. The safety monitoring system according to claim 3, wherein the detection device determines whether the object is a person, based on an intensity of the reflected infrared light.

5. The safety monitoring system according to claim 4, further comprising:
   an audio output device that emits a warning sound, wherein
   if the detection device detects the person, the control device controls the audio output device to emit the warning sound.

6. The safety monitoring system according to claim 5, wherein the audio output device changes the warning sound in accordance with a distance to the person detected by the detection device.

7. The safety monitoring system according to claim 1, comprising:
   a plurality of the detection devices that detect the object in respectively corresponding directions; and
   a display device that displays, on one screen, a plurality of the images captured in the respectively corresponding directions.

8. The safety monitoring system according to claim 1, comprising:
   a plurality of the detection devices that detect the object in respectively corresponding directions; and
   a plurality of display devices that display the image captured in the corresponding directions.

* * * * *